US006784561B2

(12) United States Patent
Ootori

(10) Patent No.: US 6,784,561 B2
(45) Date of Patent: Aug. 31, 2004

(54) RESISTANCE FORCE GENERATOR FOR USE IN A GAME MACHINE

(75) Inventor: Yasuhiro Ootori, Kanagawa-ken (JP)

(73) Assignee: Sony Computer Entertainment Inc., Tokyo (JP)

( * ) Notice: Subject to any disclaimer, the term of this patent is extended or adjusted under 35 U.S.C. 154(b) by 241 days.

(21) Appl. No.: 10/295,215

(22) Filed: Nov. 15, 2002

(65) Prior Publication Data

US 2003/0127863 A1 Jul. 10, 2003

Related U.S. Application Data

(63) Continuation of application No. 09/488,448, filed on Jan. 20, 2000, now abandoned.

(30) Foreign Application Priority Data

Jan. 21, 1999 (JP) .......................................... P11-013494

(51) Int. Cl.[7] .............................................. H02K 7/06
(52) U.S. Cl. .............................. 290/1 R; 322/7; 310/81
(58) Field of Search ................................ 290/1 R, 5, 6; 322/7, 8; 310/81, 15

(56) References Cited

U.S. PATENT DOCUMENTS

| 3,305,055 A | | 2/1967 | Slaughter |
| 4,350,913 A | | 9/1982 | Eddens |
| 4,565,108 A | | 1/1986 | Makita |
| 4,575,103 A | * | 3/1986 | Pedu ........................... 277/410 |
| 4,611,697 A | | 9/1986 | Okita et al. |
| 4,654,576 A | | 3/1987 | Oelsch et al. |
| 5,015,926 A | * | 5/1991 | Casler ........................... 318/9 |
| 5,081,882 A | | 1/1992 | Kogure |
| 5,310,392 A | | 5/1994 | Lo |
| 5,324,242 A | | 6/1994 | Lo |
| 5,598,090 A | | 1/1997 | Baker et al. |
| 5,628,267 A | * | 5/1997 | Hoshio et al. ............... 114/122 |
| 5,713,792 A | | 2/1998 | Ohzono et al. |
| 5,742,278 A | | 4/1998 | Chen et al. |
| 5,805,140 A | | 9/1998 | Rosenberg et al. |
| 5,816,372 A | | 10/1998 | Carlson et al. |
| 5,889,670 A | | 3/1999 | Schuler et al. |
| 5,889,672 A | | 3/1999 | Schuler et al. |
| 5,990,869 A | | 11/1999 | Kubica et al. |
| 6,001,014 A | | 12/1999 | Ogata et al. |
| 6,004,134 A | | 12/1999 | Marcus et al. |
| 6,320,284 B1 | * | 11/2001 | Fontana et al. ................ 310/12 |
| 6,365,995 B1 | * | 4/2002 | Fukuda et al. ................. 310/81 |
| 6,486,579 B1 | * | 11/2002 | Furuya et al. ................. 310/81 |
| 2002/0079762 A1 | * | 6/2002 | Fukuda et al. ................. 310/81 |
| 2003/0067231 A1 | * | 4/2003 | Masuda ........................... 33/0 |

FOREIGN PATENT DOCUMENTS

| DE | 1067645 | 10/1959 |
| JP | 61-52740 | 4/1986 |
| JP | 62-127642 | 8/1987 |
| JP | 4-17525 | 2/1992 |
| JP | 07-012147 | 1/1995 |
| JP | 08-196742 | 8/1996 |
| JP | 08-326783 | 12/1996 |
| JP | 09-163777 | 6/1997 |
| JP | 10-506175 | 6/1998 |
| JP | 10-184758 | 7/1998 |
| JP | 2000-112619 | 4/2000 |

* cited by examiner

*Primary Examiner*—Nicholas Ponomarenko
(74) *Attorney, Agent, or Firm*—Katten Muchin Zavis Rosenman

(57) ABSTRACT

A resistance force generator generates, in accordance with game information, a resistance force corresponding to an input operation on a trigger of an operation device which inputs information to a main unit of a game machine. The resistance force generator has a container that accommodates a magnetic powder, rotating vanes which are provided inside the container and rotate based on the input operation of the trigger, and an electromagnet which generates a magnetic field inside the container in accordance with game information.

20 Claims, 17 Drawing Sheets

RESISTANCE FORCE GENERATOR FOR USE IN A GAME MACHINE

CROSS REFERENCE TO RELATED APPLICATIONS

This is a continuation of U.S. application Ser. No. 09/488,448, filed Jan. 20, 2000, now abandoned.

FIELD OF THE INVENTION

This invention relates to a resistance force generator that generates a resistance force on an input operation unit in accordance with the game content (information), such as the type or status of the game.

BACKGROUND OF THE INVENTION

Conventionally, an input operation unit such as a button or a lever of an operation device for a game machine for home use is impelled by a spring or the like so as to restore a prescribed state, and when the input operation unit is operated, the spring is deformed in accordance with its displacement and it is subject to a reaction force due to its resilience.

With such a construction, if one plays a game by prescribing the actions on the action target on the monitor screen by manipulating operation buttons, etc., one can only experience what happens by watching the character on the monitor's screen (video) and by hearing the sound that is generated from the monitor (audio), and because actually the actions take place only functionally by manipulation of the user's fingers, there is no experiential function provided by the feedback to the operation device.

Reaction generators have been developed whereby when, due to the type of the game and manipulation of the input operation unit, one encounters a specified action or scene, the game performance is improved with an enhanced sense of presence in that the experience fed back from the game machine main unit to one's fingers and arms is obtained in the input unit itself.

For example, a device shown in FIG. 1 converts the turning force generated by a motor 1, etc. to a linear motion while reducing speed and increasing power with a speed reduction mechanism 6 of a gear 2, a gear 3, a pinion 4, a rack 5, etc., thus performing transmission to the input operation unit of a lever 8, etc. by a linkage 7. Interposed between the speed reduction mechanism 6 and the linkage 7 is a buffering member 10 formed of a spring 9, etc. The buffering member 10 generates a reaction force in accordance with the operation displacement of lever 8 and prevents an excessive force from being applied to the constituent parts.

A device shown in FIG. 2 is constructed so as to transmit the turning force generated by motor 11, etc. to the input operation unit formed of a lever 20, etc. via a speed reduction mechanism 16 of a worm 12, a worm wheel 13, a pinion 14, a rack 15, etc., a buffering member 18 formed of a spring 17, etc., and a linkage 19. This device differs from that in FIG. 1 in that the rack 15 and the pinion 14 prevent the reaction force of the input unit from being transmitted to the motor 11.

In the devices shown in FIGS. 1 and 2, the reaction force of the levers 8, 20 is modified by modifying the amount of deflection of the springs 9, 17 by the drive of motors 1, 11 in accordance with game information.

On these two devices, providing a speed reduction mechanisms 6, 16 increases the number of parts and is disadvantageous in reliability and cost.

Because a number of mechanisms are interposed between the motors 1, 11 and the input operation units, there is rattling caused by a backlash, which tends to detract from the direct feeling transmitted to the fingertips, because the desired resistance force is not generated instantaneously.

Moreover, in the conventional devices of this type, a "reaction force" is generated which is proportional to the amount of manipulation of the input operation unit, that is, to the displacement of the input operation unit. If the amount of displacement of the input operation unit from its neutral state is small, the reaction force is small, and if it is large, the reaction force is large. Thus it has been impossible to generate a "resistance force" that is proportional to the operation speed of the input operation unit.

SUMMARY OF THE INVENTION

It is an object of the present invention to solve the above problems, and to provide a resistance force generator that can generate a "resistance force" which is proportional to the operation speed of the input operation unit, can reduce the number of parts, and allow one to have a full direct feeling in the sense of touch transmitted to the fingertips.

The above and other objects of the present invention are obtained by a resistance force generator that generates, in accordance with game information, a resistance force which corresponds to input operations on an input operation unit of the input means, by which information is input to the main unit, of the main unit of the game machine, the resister force generator comprising a container that accommodates a magnetic substance; rotating members which rotate based on an input operation of the input operation unit, and a magnetic field generation means which generates a magnetic field inside said container in accordance with the game information.

The rotating members may be arranged in a state in which a part of their periphery is immersed in said magnetic substance when there is no magnetic field, or they may be arranged in a state in which all of one of their surface sides is immersed in said magnetic substance when there is no magnetic field. Also, the rotating members may have a structure that has an accommodation unit which accommodates said magnetic substance when there is a magnetic field. Preferably, the rotating members are rotary vanes made of a nonmagnetic substance.

As the magnetic substance, one may use a magnetic powder or a magnetic fluid.

As the magnetic field generation means, one may use an electromagnet, etc. Preferably, this magnetic field generation means is arranged so that it collects the magnetic substance over the entire region of the rotating members when a magnetic field is generated.

The container may have a structure that has, in a part separated from the rotating members, a space in which a magnetic substance collects when a magnetic field is generated.

With such a configuration, generating a magnetic field with the magnetic field generation means causes the magnetic substance to be excited and magnetically aggregate, and consequently increases or decreases the resistance force of the rotation of the rotating members.

Also, the resistance force generator that generates, in accordance with game information, resistance force that corresponds to input operations on the input operation unit of the input means comprises a magnetic member which rotates based on input operation of the input operation unit and a magnetic field generation means that produces a magnetic field directed toward said magnetic member in accordance with game information.

With such a configuration, the resistance force of the rotation of the magnetic member is increased by generating a magnetic field by means of the magnetic field generation means.

DETAILED DESCRIPTION OF THE PREFERRED EMBODIMENTS

A game machine that makes use of the resistance force generator according to the first embodiment of this invention will be explained with reference to FIGS. 3 through 10.

Figure 1:
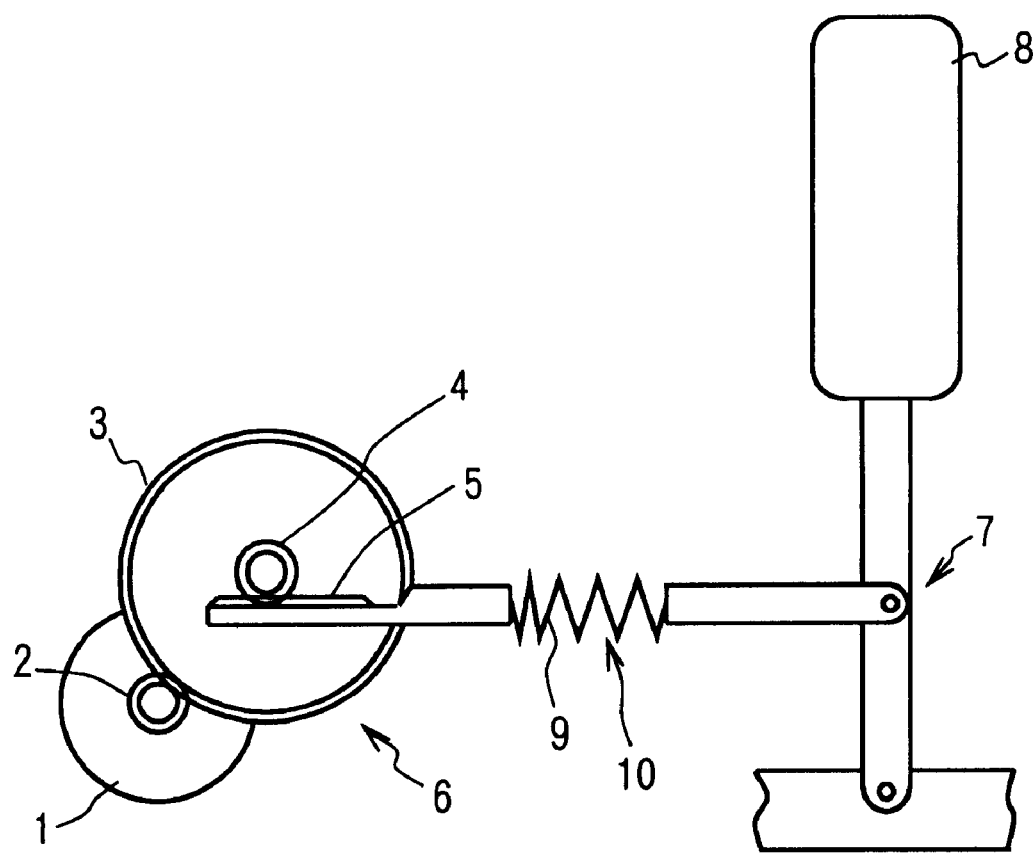
FIG. 1 is a diagram showing a conventional reaction force generator.
Figure 2:
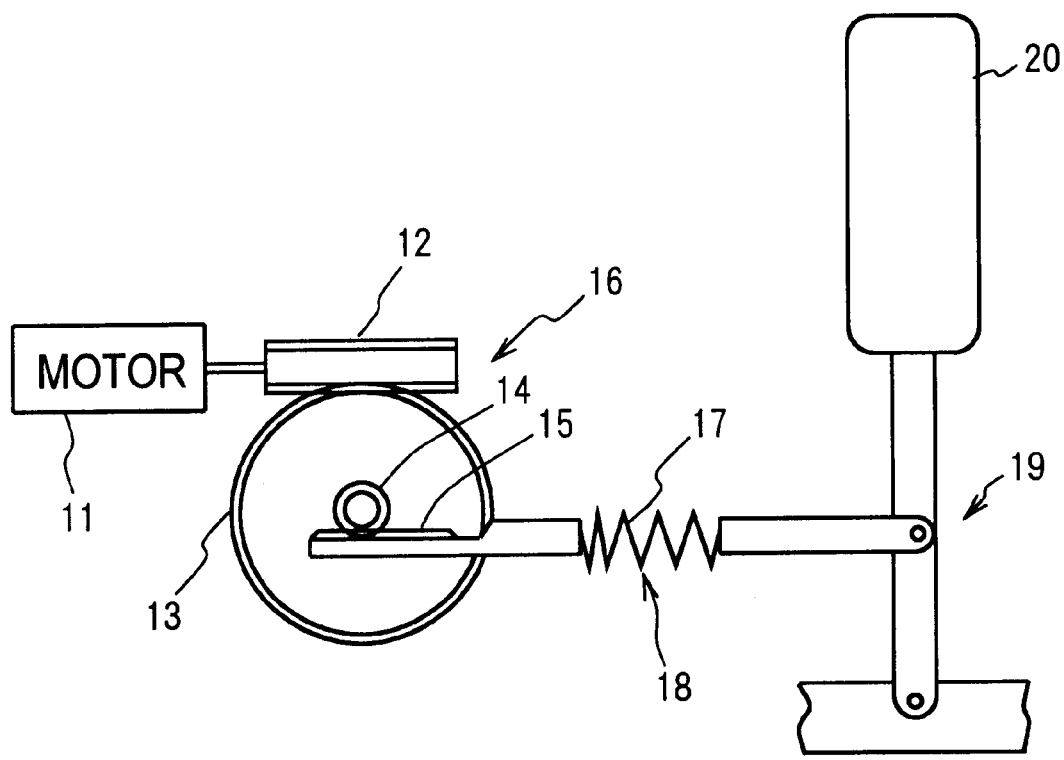
FIG. 2 is a diagram showing another conventional reaction force generator.
Figure 3:
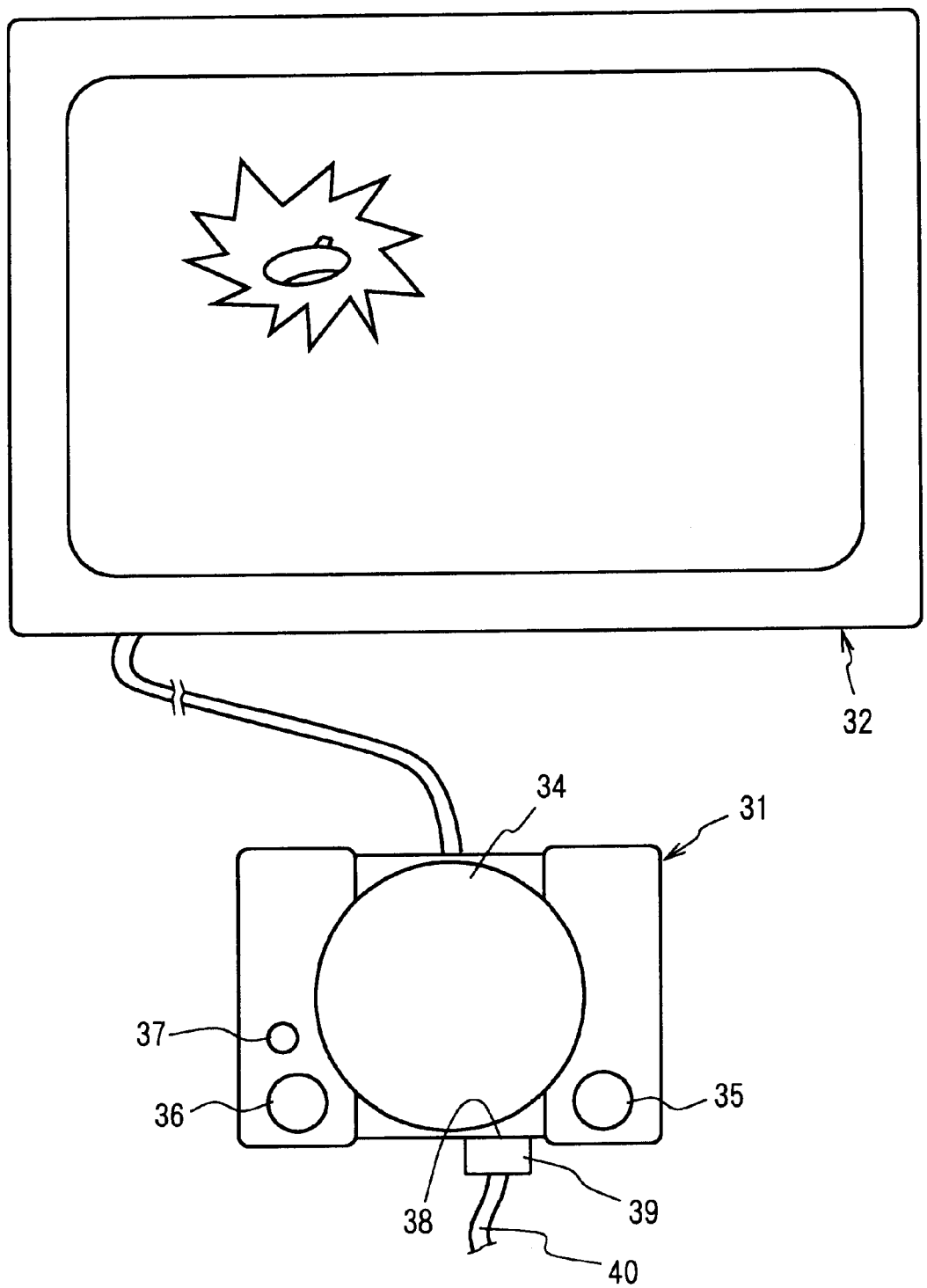
FIG. 3 is a schematic diagram showing a game machine for explaining a first embodiment of the present invention.
Figure 4:
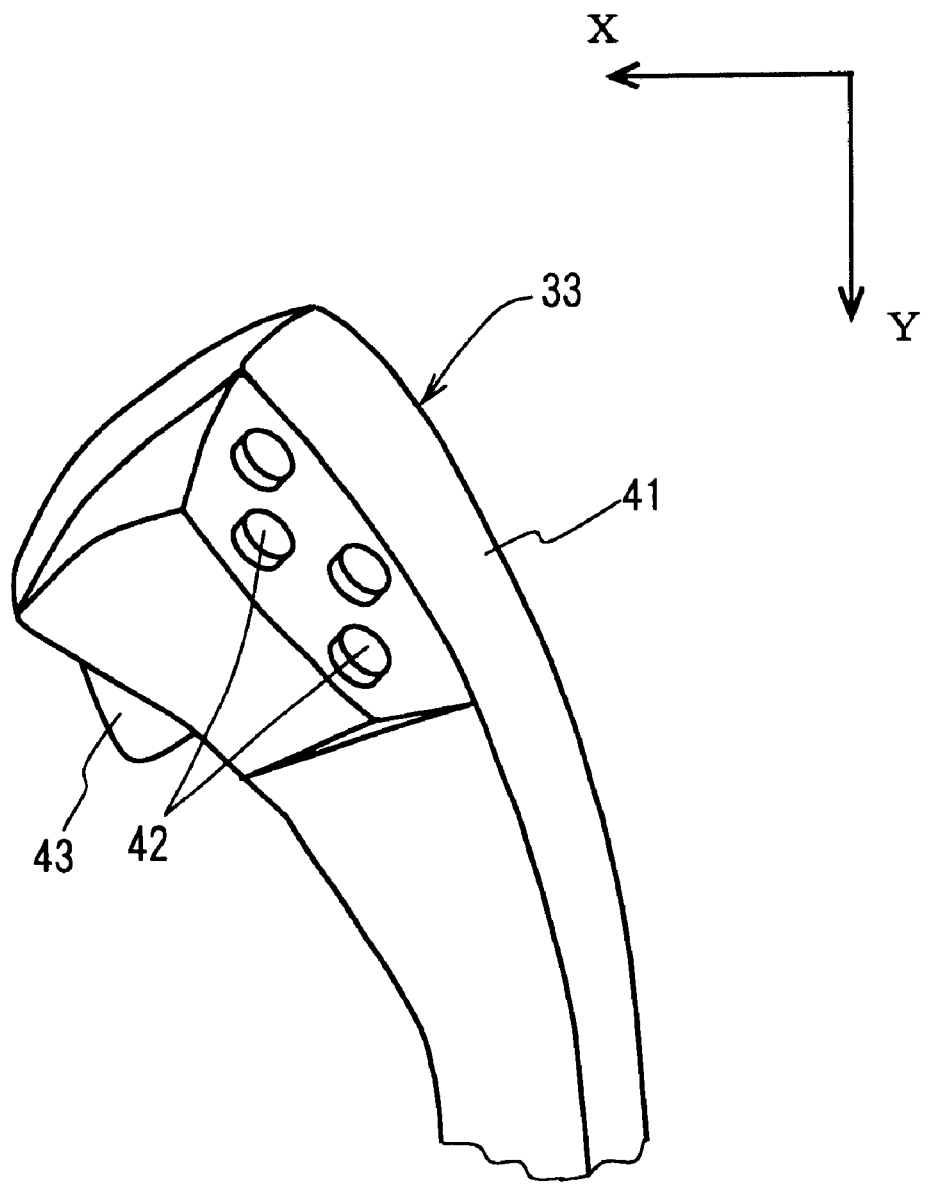
FIG. 4 is a diagram showing an operation device of the game machine of FIG. 3.

In FIG. 3, 31 is a main unit at the game machine which is connected to a monitor 32, such as a television receiver, and to a game machine operation device (input means) 33 (see FIG. 4).

Built into the main unit 31 is a CD-ROM driver having a function to reproduce a CD-ROM which is a video recording medium. On the top surface of the game machine main unit 31 is a structure provided with a cover member 34, which accommodates and covers the CD-ROM, an opening and closing switch 35 which opens and closes the cover member 34, a power switch 36, which supplies electric power, a reset switch 37 which sets the operation of the main unit 31 into its initial state, and a connection unit 38 to which two operation devices can be connected. By connecting a connector 39 of game machine operation device 33 (which will be described later on) to the connection unit 38, the main unit 31 and the game machine operation device 33 are electrically connected via a cable 40, and a two-way communication is made possible between the main unit 31 and the game machine operation unit 33.

As shown in FIG. 4, the game machine operation device 33 allows the desired input operation to be performed by having the whole thereof tilt in the x direction and y direction, and it is connected to the main unit 31 and monitor 32, etc., such as a television receiver.

The operation device 33 has a housing 41 that is shaped roughly like a stick so as to make it possible to grasp and operate it with one hand. This housing has input buttons 42 . . . on its rear side (the near side) and a trigger 43 as an input operation unit on its front side (the far side).

Also, inside the housing 41 are switches (not shown), a circuit board (not shown) for controlling communication with a playable main unit 31 which accommodates a CD-ROM which is a video recording medium, and a resistance force generator 53, which will be described in detail later on.

Figure 5:
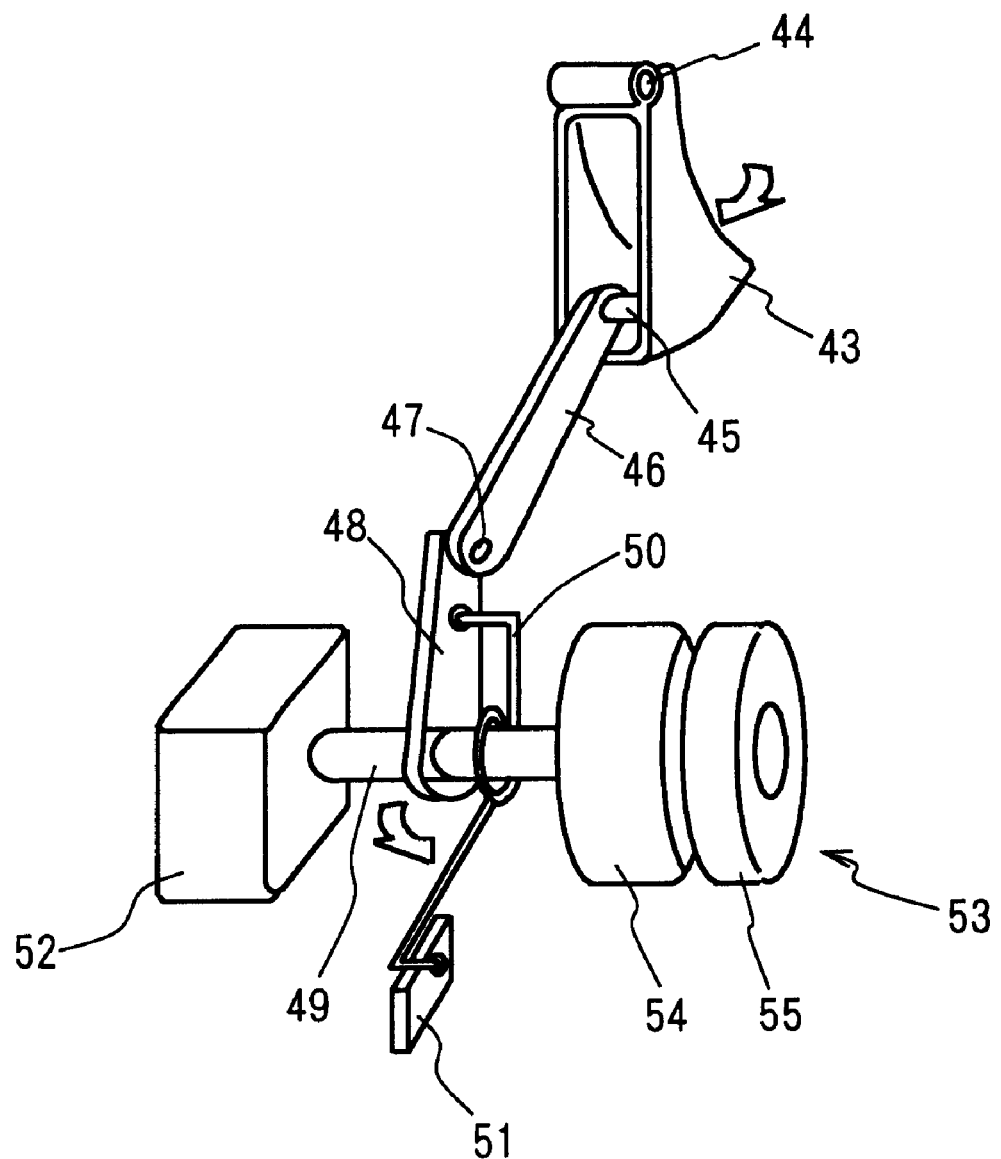
FIG. 5 is a perspective view showing a resistance force generator of the operation device of FIG. 4.

As shown in FIG. 5, a trigger 43 is provided so as to freely rotate in housing 41 about a rotation shaft 44. As it rotates, trigger 43 can protrude from and be inserted into holes (not shown) in housing 41. Trigger 43 is prevented from being pulled outside of housing 41 by a stopper (not shown).

Shaft 45 is provided on the rotation-free end of trigger 43, and one end of a rod 46 is coupled rotatably to shaft 45. The other end of rod 46 is coupled rotatably to the rotation-free end of an arm 48 via a shaft 47, and the base end of arm 48 is fixed to a shaft 49.

Attached to shaft 49 is the base end part of a forked spring 50. One end of spring 50 engages with arm 48, and its other end engages with an engagement part 51 of housing 41. Reaction force proportional to the displacement of trigger 43 is provided by elastic force of spring 50. If the amount of displacement is small, the reaction force caused by spring 50 is small, and conversely if it is large, the reaction force is large.

Knob 52 is coupled to one end of shaft 49. When trigger 43 is operated, knob 52 turns, and an input signal is generated.

Coupled to the other end of shaft 49 is a resistance force generator 53, which, in accordance with game information, puts onto trigger 43 a resistance force that corresponds to the input operation.

The resistance force generator 53 has a container 54 and an electromagnet (magnetic field generation means) 55.

Figure 6:
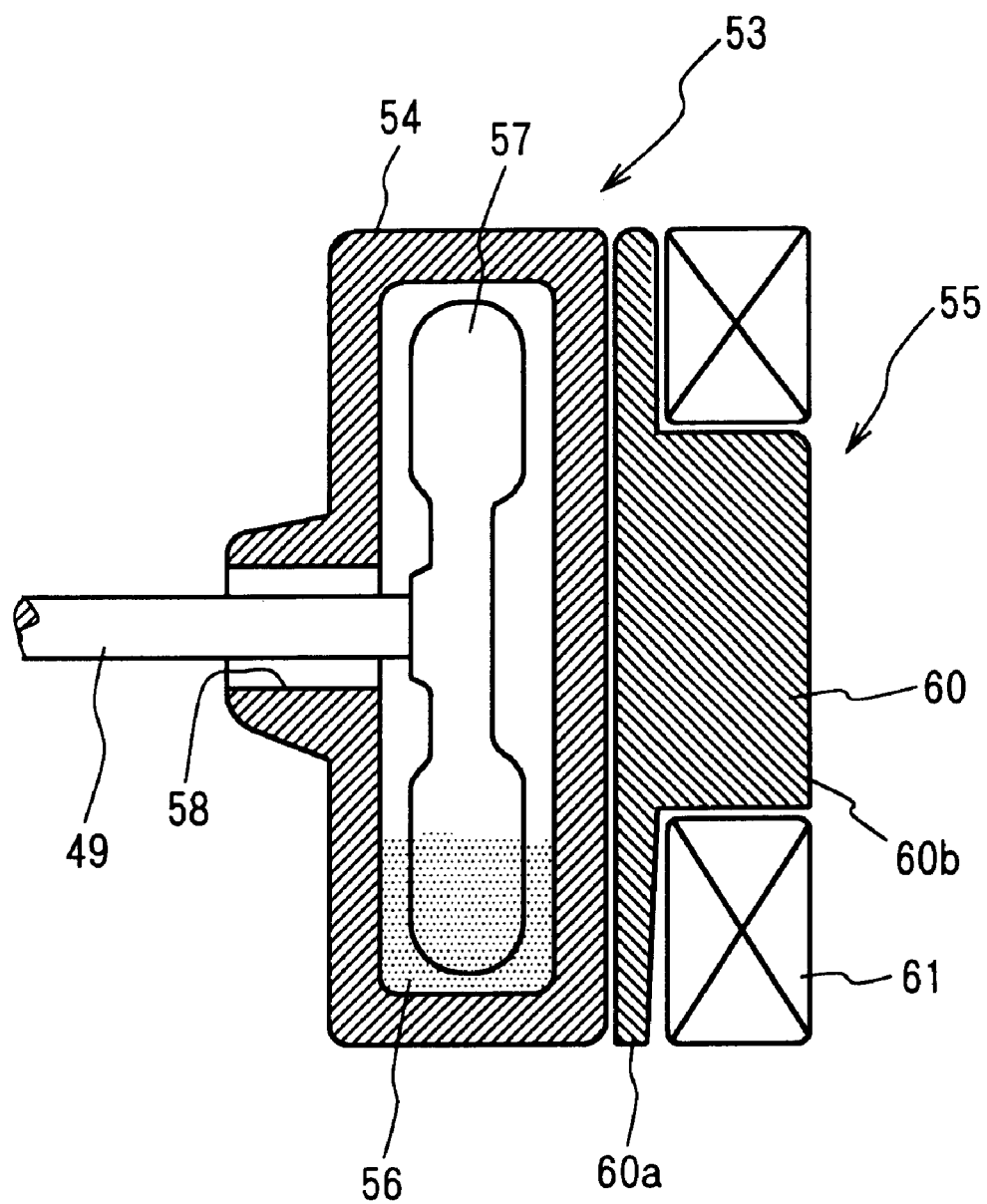
FIG. 6 is a cross-sectional view showing the key parts of the reaction force generator.

Container 54 is shaped as a circular cylinder with a base. As shown in FIG. 6, a small quantity of magnetic powder (magnetic substance) 56 is sealed in container 54, and rotating vanes (rotating members) 57, which are made of a nonmagnetic substance, are accommodated in it.

Rotating vanes 57 are attached to the end of shaft 49. That is, an insertion opening 58 is provided in container 54, and the end of shaft 49 is inserted through this insertion opening 58 into the interior of container 54. Rotating vanes 57 are attached to the insertion end part of shaft 49, and they rotate based on the input operation of trigger 43.

Magnetic powder 56 is accommodated so that it pools in the bottom of container 54 when there is no magnetic field, and rotating vanes 57 are arranged so that part of their periphery is immersed in the magnetic powder 56 that pools in bottom when there is no magnetic field.

Figure 7:
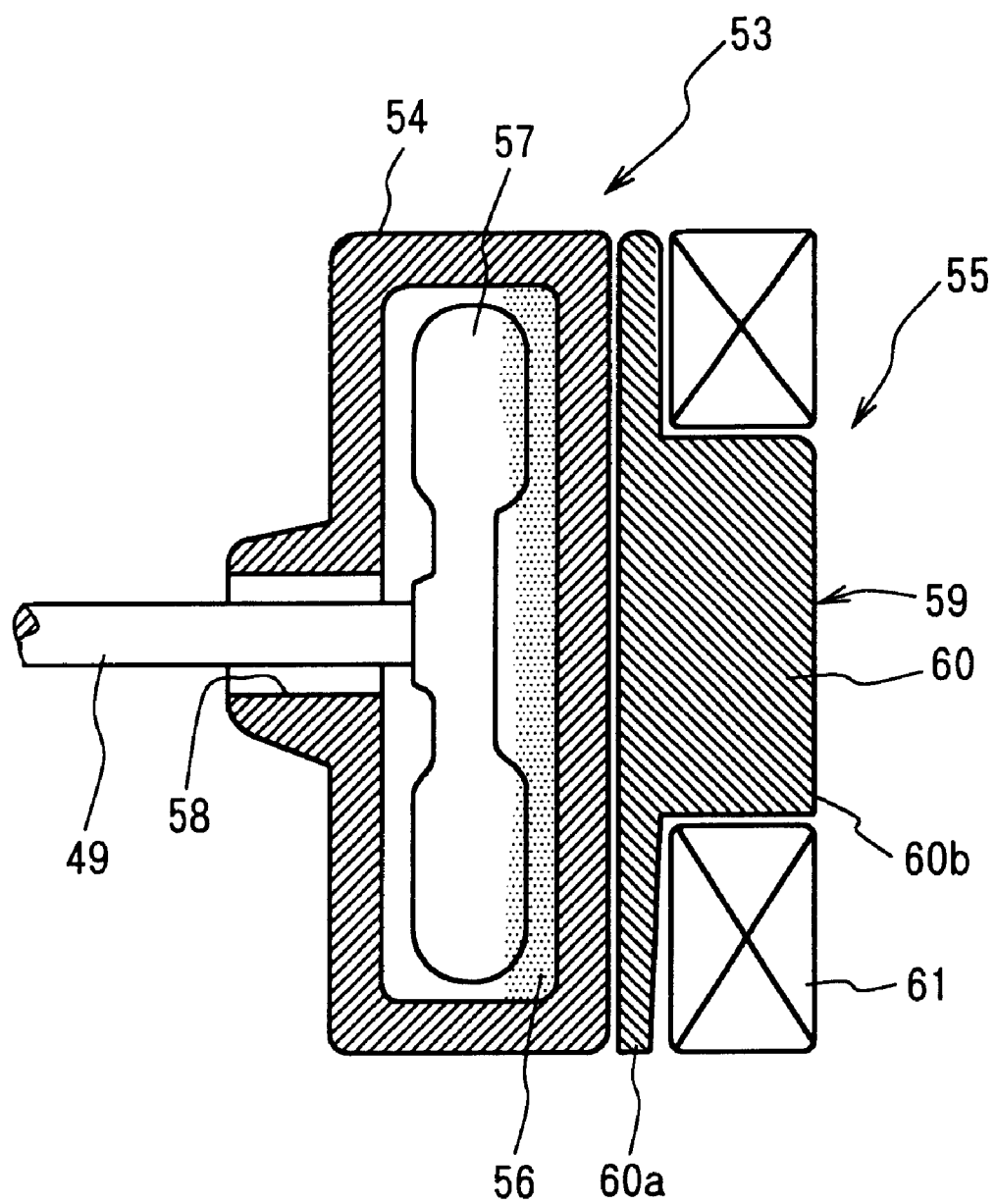
FIG. 7 is a cross-sectional view for explaining the operation of the reaction force generator of the present invention.

Electromagnet 55 generates a magnetic field inside container 54 in accordance with game information, so it is provided on the end face of the side opposite to insertion opening 58 of container 54, and it has an iron core 60 and a coil 61. Iron core 60 consists of a large-diameter part 60a which is arranged adjacent to the end face of container 54, and a small-diameter part 60b which partly touches the large-diameter part 60a. Coil 61 is arranged on the small-diameter part 60b. As shown in FIG. 7, magnetic powder collects in the entire region of rotating vanes 57 when electromagnet 55 generates a magnetic field.

Returning to FIG. 5, when trigger 43 is pushed in, spring 50 is deformed against the elastic force. A reaction force that is proportional to the input operation displacement is applied to trigger 43, knob 52 and rotating vanes 57 are rotated, and an input signal is output from knob 52.

Figure 8:
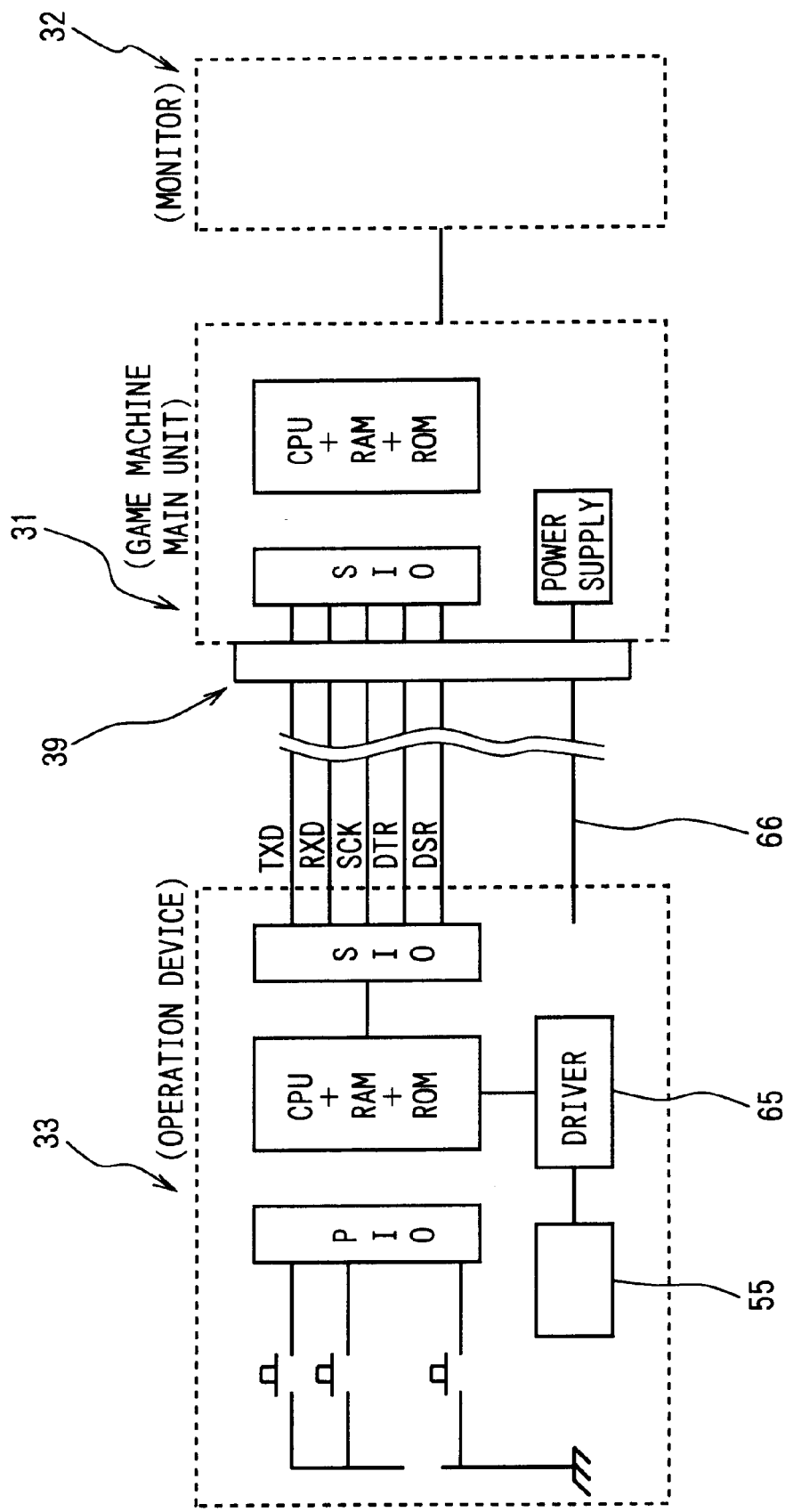
FIG. 8 is a block diagram of the operation device of the game machine and the state of connection with the main unit of the game machine.

Meanwhile, depending on the game information, a driver 65, which is discussed below in FIG. 8, is driven. A current that corresponds to the game information flows from driver 65 to coil 61, and a magnetic force that corresponds to the current is generated.

That is, normally, as shown in FIG. 6, current does not flow in coil 61, magnetic powder 56 falls to the base of container 54, and it comes into contact with only part of rotating vanes 57, namely the peripheral lower part, and there is no phenomenon of aggregation (the magnetic powder's tightly cohering and forming) due to the magnetic force. Therefore the rotation resistance of rotating vanes 57 is small.

When, based on game information, current flows in coil 61, as shown in FIG. 7, magnetic powder 56 collects on the entire region of rotating vanes 57, and the resistance against rotation of rotating vanes 57 is increased. That is, the magnetic field generated by electromagnet 55 excites and magnetically aggregates magnetic powder 56 and increases the rotation resistance force of rotating vanes 57. In this way, resistance force corresponding to game information is applied to trigger 43. In this case, resistance force is obtained on trigger 43 which is proportional to the input operation speed of trigger 43 regardless of the input operation displacement, because it is a method in which a resistance force is generated in rotating vanes 57 by the aggregation of magnetic powder 56.

Next, a two-way communication function will be explained. As shown in FIG. 8, the game machine operation device 33 has a structure having an I/O interface SIO which performs serial communication with the main unit 31, a parallel I/O interface PIO that inputs operation data from multiple operation buttons, a one-chip microprocessor formed of a CPU, RAM and ROM, electromagnet 55 and driver 65 that supplies current that corresponds to game information.

Meanwhile, the main unit 31 is arranged so as to have a serial I/O interface SIO which performs serial communication with game machine operation device 33, and when connector 39 of game machine operation device 33 is connected thereto, it is connected with the serial I/O interface SIO on the game machine operation device 33 side via connector 39, and thus a two-way communication means is formed and a two-way serial communication can be done.

The Signal lines and control lines by which two-way serial communication is performed include a signal line TXD for data transmission that sends data from the main unit 31 to game machine operation unit 33, a signal line RXD for data transmission that sends data from the game machine operation unit 33 side to the main unit 31 side, a signal line SCK (serial clock) for the serial synchronization clock used to extract data from each of data transmission signal lines TXD and RXD, and control line DTR (data terminal ready) for establishing and interrupting communication of game machine operation device 33, which is the terminal side.

Included among the cables that have the signal lines and control lines by which the two-way serial communication is performed is, besides the signal lines and control lines, a power cable 66, which is taken directly from the power source on the main unit 31 side. The power cable 66 is connected to driver 65 on the game machine operation device 33 side and supplies power to electromagnet 55.

In the two-way serial communication procedure used in the above arrangement, in order for the main unit 31 to communicate with the game machine operation device 33 and take in the operation data from operation buttons 42 (the button information), first, the main unit 31 confirms via control line DTR that it is selected, following which the game machine operation device 33 goes into a standby state for reception of signal line TXD. Next, the main unit 31 sends out to signal line TXD for data transmission an identification code that indicates the game machine operation device 33. In this way, game machine operation device 33 receives this identification code from signal line TXD.

Hereafter communication with game machine main unit 31 begins since the identification code indicates game machine operation device 33. That is, control data, etc. is sent from main unit 31 to game machine operation device 33 via data transmission signal line TXD, and conversely operation data, etc. operated by operation buttons 42 . . . is sent from game machine operation device 33 to main unit 31 via data transmission signal line RXD. In this way, two-way serial communication takes place between main unit 31 and game machine operation device 33, and this communication is brought to an end when main unit 31 outputs a selection cancellation signal via control line DTR.

If equipped with a two-way serial communication function, operation button operation data, etc. can be sent to the main unit 31 side mainly from the game machine operation device 33 side, and resistance force data for supplying to electromagnet 55 the current to generate magnetic force in accordance with game information can be sent out to the game machine operation device 33 side via data transmission signal line TXD. This resistance force data corresponding to game information is preset by the game CD-ROM mounted on main unit 31, and feedback is carried out by fixed-time dynamic transmission from main unit 31 to game machine operation device 33 itself in accordance with the type, content, and state of the game and the action targets of the users playing the game. This point is further explained with reference to FIGS. 9 and 10.

Figure 9:
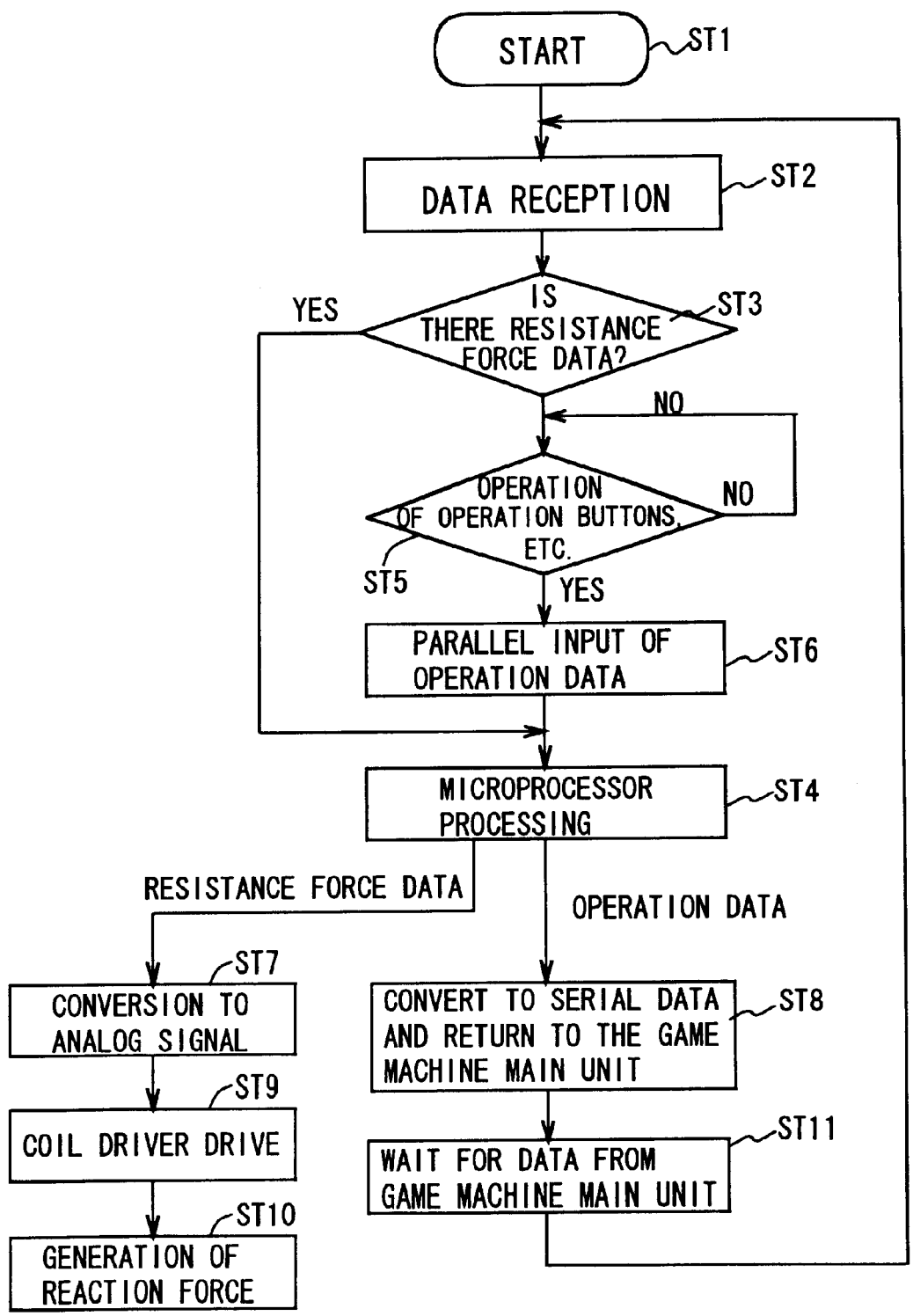
FIG. 9 is a flowchart showing the processing procedure on the side of the operation device for the game machine.

First, the processing procedure on the side of operation device 33 will be described with reference to FIG. 9. In step ST1, the CD-ROM for a specified game is loaded on the main unit 31, commencement of the game is set by the start switch of game machine operation device 33, the state in which the game is played results from operation of select switches, and one proceeds to step ST2.

In step ST2, upon the game start, a microprocessor consisting of the CPU, RAM, and ROM of game machine operation device 33 constantly monitors whether reaction force data has been sent from the game machine main unit 31 side via the serial I/O interface. Included in this resistance force data is data by which to drive electromagnet 55 in accordance with game information. Next, one proceeds to step ST3.

In step ST3, the resistance force data in the data signal received on the game machine operation device 33 side is judged. If there is resistance force data, one proceeds to step ST4, and if there is no reaction force data, one proceeds to step ST5.

In step ST5, it is decided whether operation buttons, etc. have been operated; if so, one proceeds to step ST6, and if not, a wait state results and monitoring continuously monitors to check whether or not an operation is performed.

In step ST6, the operation data is output via parallel I/O interface PIO, and one proceeds to step ST4.

In step ST4, the reaction force data is processed by the microprocessor, and one proceeds to step ST7. Also, the operation data from parallel I/O interface PIO is processed, and one proceeds to step ST8.

In step ST7, the resistance force data is converted to an analog signal, and one proceeds to step ST9.

In step ST9, driver 65 is driven by the analog signal, electric power in accordance with game information is output from driver 65, and one proceeds to step ST10.

In step ST10, electromagnet 55 generates magnetic force by the current supplied from driver 65, thereby applying resistance force to trigger 43. That is, resistance force corresponding to game information that is generated by electromagnet 55 is superimposed on the inherent reaction force due to spring 50. In this case, the size of the resistance force added to trigger 43 varies depending upon the amount of the current supplied to electromagnet 55. In other words, the resistance force can be changed by changing the amount of the current that flows through.

In step ST8, the operation data is converted to serial data and is returned to game machine main unit 31 via serial I/O interface SIO, and one proceeds to step ST11.

In step ST11, one waits in a standby state for reception of data from game machine main unit 31, and one proceeds to step ST12.

Figure 10:
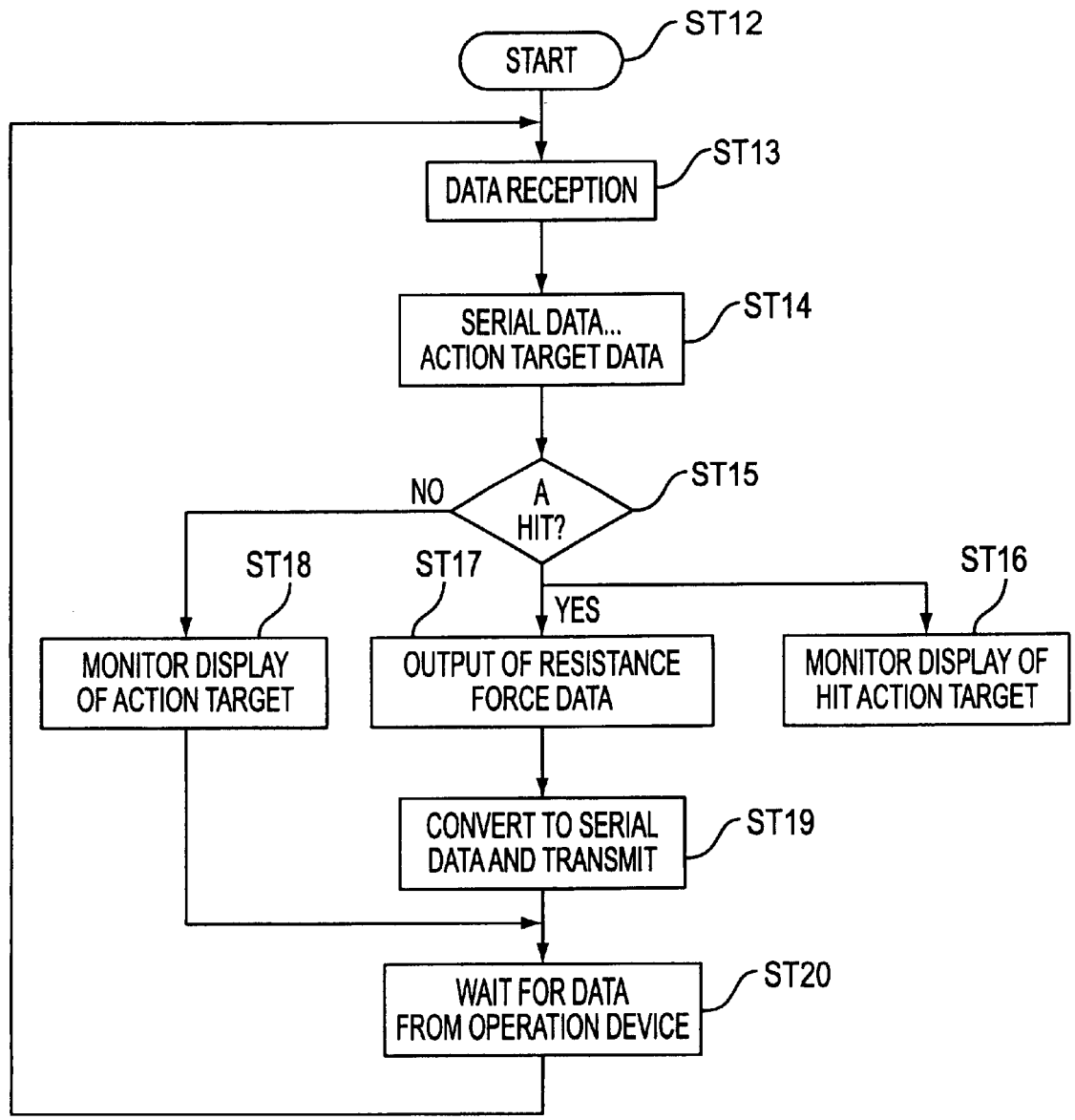
FIG. 10 is a flowchart showing the processing procedure on the side of the main unit of the game machine.

Next, to describe the processing procedure on the side of game machine main unit 31 will be described with reference to FIG. 10. First, in step ST12, a state results in which the game is played simultaneously with step ST1, and one proceeds to step ST13.

In step ST13, serial data is received from game machine operation device 33, and one proceeds to step ST14.

In step ST14, serial data is taken in so that a comparison can be made between the action target data and the received serial data, and one proceeds to step ST15.

In step ST15, a comparison is made between the action target data and the received serial data, and the hit state is distinguished. When the action target data and the received serial data are in agreement, that is, when there is a hit, one proceeds to steps ST16 and ST17. If they do not match, one proceeds to step ST18.

In step ST16, action targets that have been hit are displayed on the monitor screen.

In step ST17, the resistance force data is output, and one-proceeds to step ST19.

In step ST19, the resistance force data is converted to serial data and is returned as a specified response signal to game machine operation device 33 via serial I/O interface SIO, and one proceeds to step ST20.

In step ST18, the CPU (central processing unit) of game machine main unit 31 displays the action targets based on the operation buttons, on the monitor screen, then one proceeds to step ST20.

In step ST20, one waits for data from game machine operation device 33, and one proceeds to ST13.

With the above composition, resistance force that corresponds to game information (the content of the game) is applied to trigger 43. Moreover, in this case, because there is employed a system that generates a resistance force on rotating vanes 57 by the aggregation of magnetic powder 56, one obtains on trigger 43 a resistance force which is proportional to the input operation speed of trigger 43, without regard to its input operation displacement. Therefore one gets a full direct feeling in the sense of touch transmitted to the fingertips. In addition, the number of parts is reduced.

Also, the configuration is such that the game machine operation device 33 receives from main unit 31 the aforesaid resistance force data as a specified response signal, but one may have a configuration in which it is sent to game machine operation device 33 by one-way communication from main unit 31.

Next, another example of the resistance force generator 53 is described.

Figure 11:
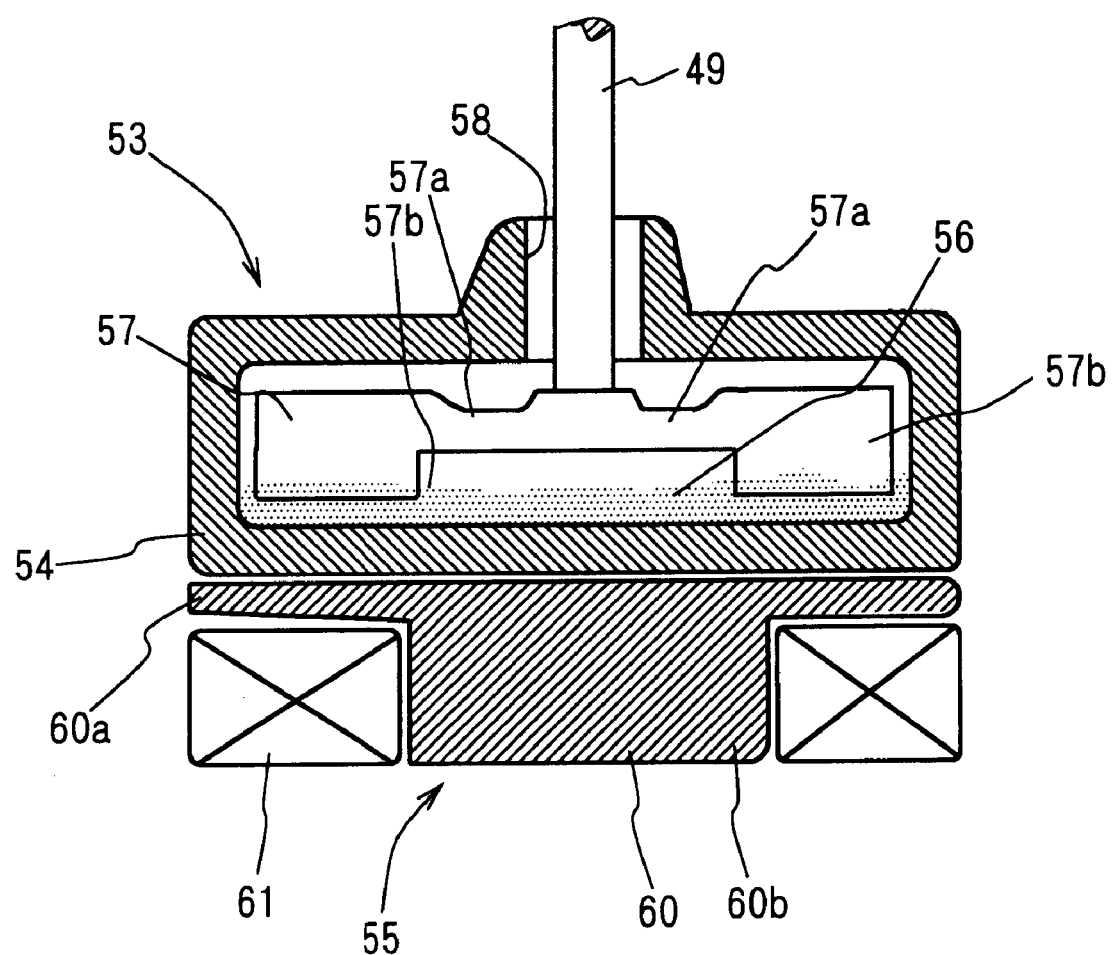
FIG. 11 is a cross-sectional view showing another example of the resistance force generator of the present invention.

In this example, as shown in FIG. 11, container 54 is arranged so that insertion opening 58 faces upward. Therefore magnetic powder 56 is accommodated so that when there is no magnetic field, it pools in the bottom inside container 54, that is, on the end face that is opposite to insertion opening 58. Rotating vanes 57 are arranged in a state where all of one side of them, that is, all of the side opposite to shaft 49, is immersed in the magnetic powder 56 that pools in the bottom when there is no magnetic field.

Figure 12:
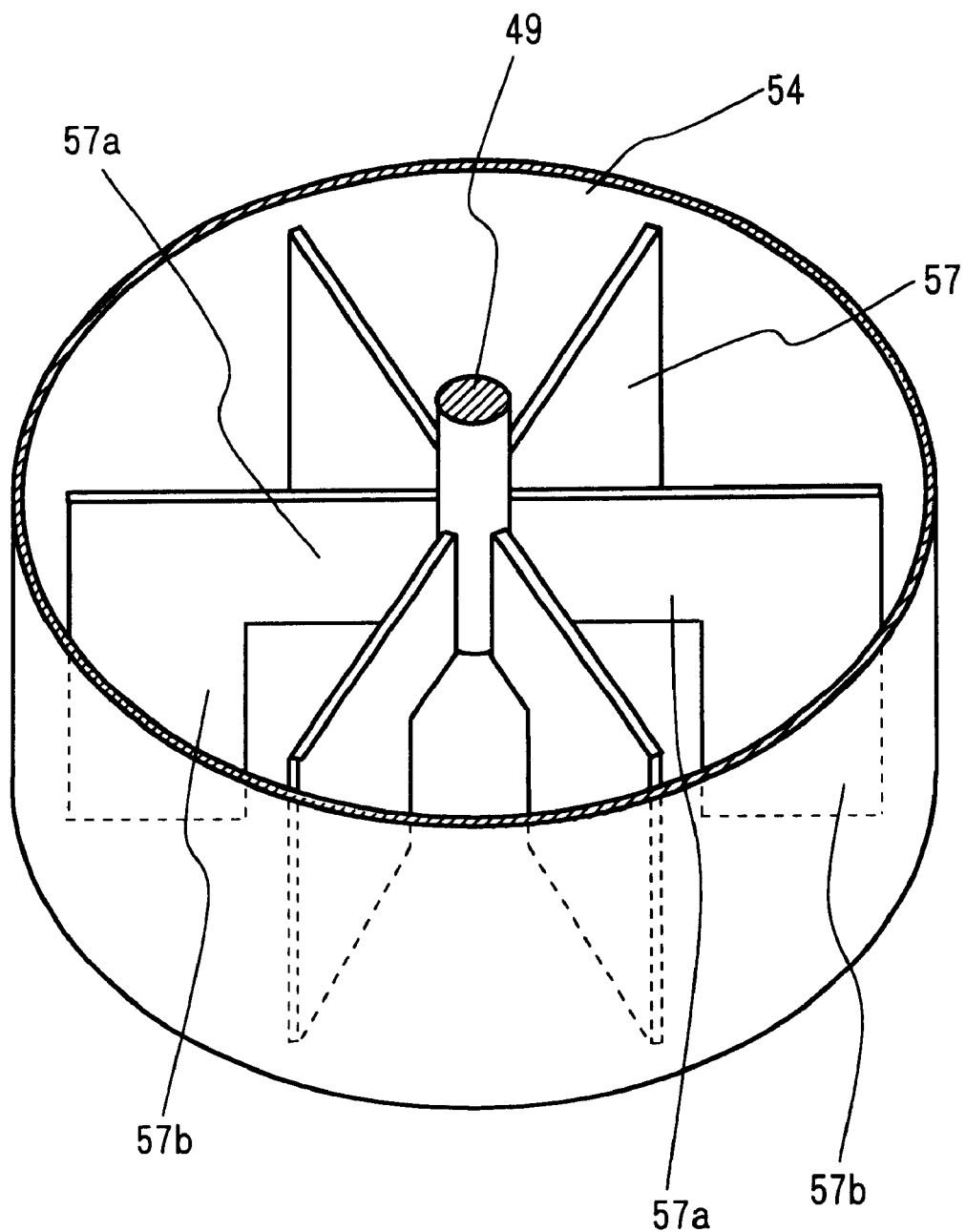
FIG. 12 is a perspective view showing the rotary vanes of resistance force generator of FIG. 11.

As shown in FIG. 12, rotating vanes 57 have arms 57a . . . which extend radially from shaft 49 and fins 57b . . . which are formed so as to be extended downward from the tips of these arms 57a . . . , and at the lower end of these fins 57b they scrape along the magnetic powder 56 that pools in the bottom of container 54.

With such a configuration, normally no current flows in coil 61 and magnetic powder 56 pools at the bottom of container 54 with no magnetic aggregation, so the rotation resistance of rotating vanes 57 is low.

When, based on game information, current flows in coil 61, magnetic powder 56 magnetically aggregates, thereby increasing the rotation resistance of rotating vanes 57.

Next, still another example of the resistance force generator 53 will be described.

Figure 13:
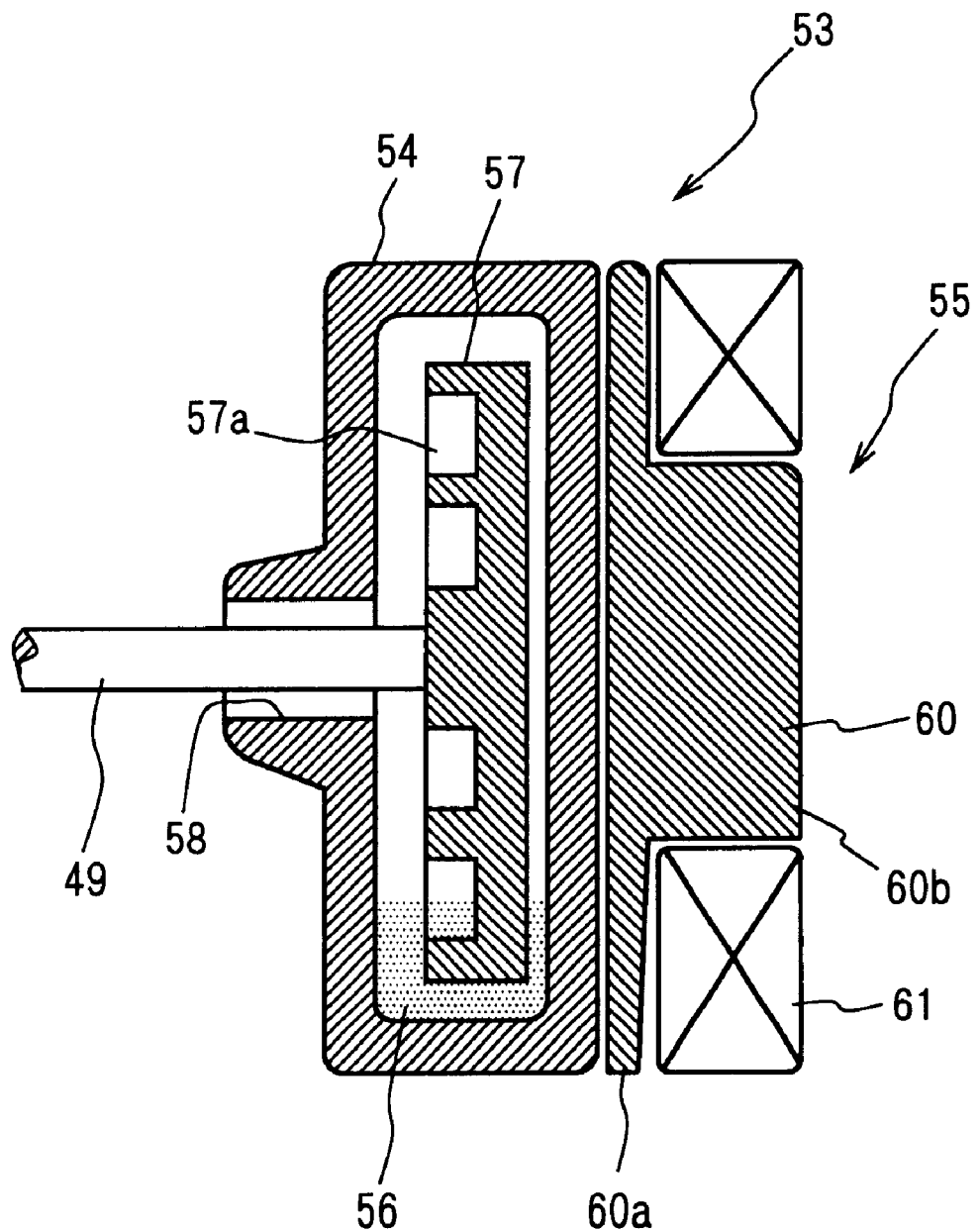
FIG. 13 is a cross-sectional view of still another example of the resistance force generator.

In this embodiment example shown in 13, rotating vanes 57 have a structure having an accommodation part 57a in which magnetic powder 56 is collected when a magnetic field is generated. That is, normally, as shown in FIG. 13, no current flows in coil 61, magnetic powder 56 falls to the bottom of container 54, and only part of rotating vanes 57, namely their lower edges, come in contact with it. In this case, the quantity and type of magnetic powder 56 is selected so that a resistance force is applied to rotating vanes 57 by magnetic powder 56. Therefore the rotation resistance of rotating vanes 57 at this time is large.

Figure 14:
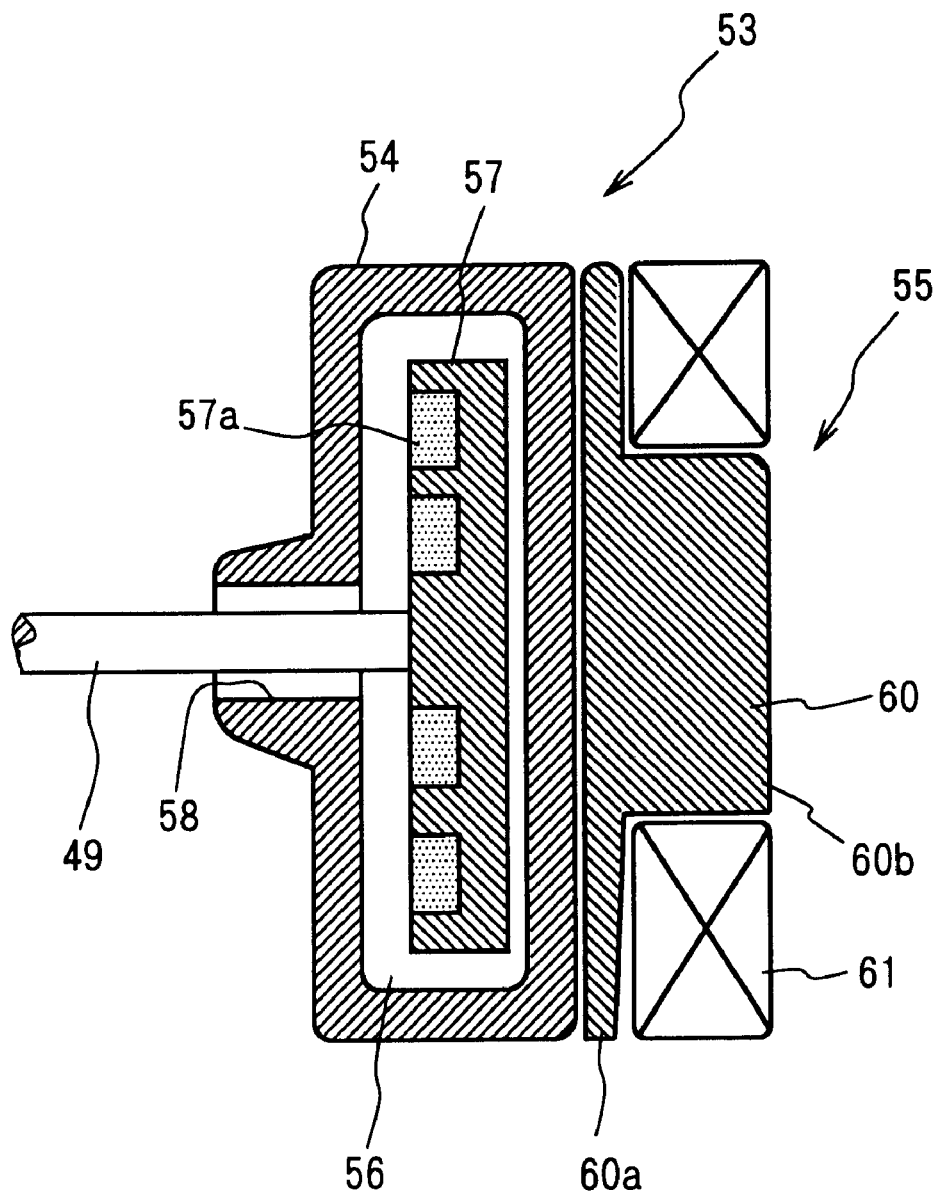
FIG. 14 is a cross-sectional view for explaining the operation of the reaction force generator of FIG. 13.

When current flows in coil 61 based on game information, as shown in FIG. 14, magnetic powder 56 is accommodated in accommodation part 57a of rotating vanes 57 by the magnetic field. Therefore, the rotation resistance of rotating vanes 57 is made smaller in accordance with the current that flows in coil 61.

In this case too, one obtains on trigger 43 a resistance force which is proportional to the input operation speed of trigger 43, regardless of the input operation displacement.

Next, still another example of the resistance force generator 53 will be described.

Figure 15:
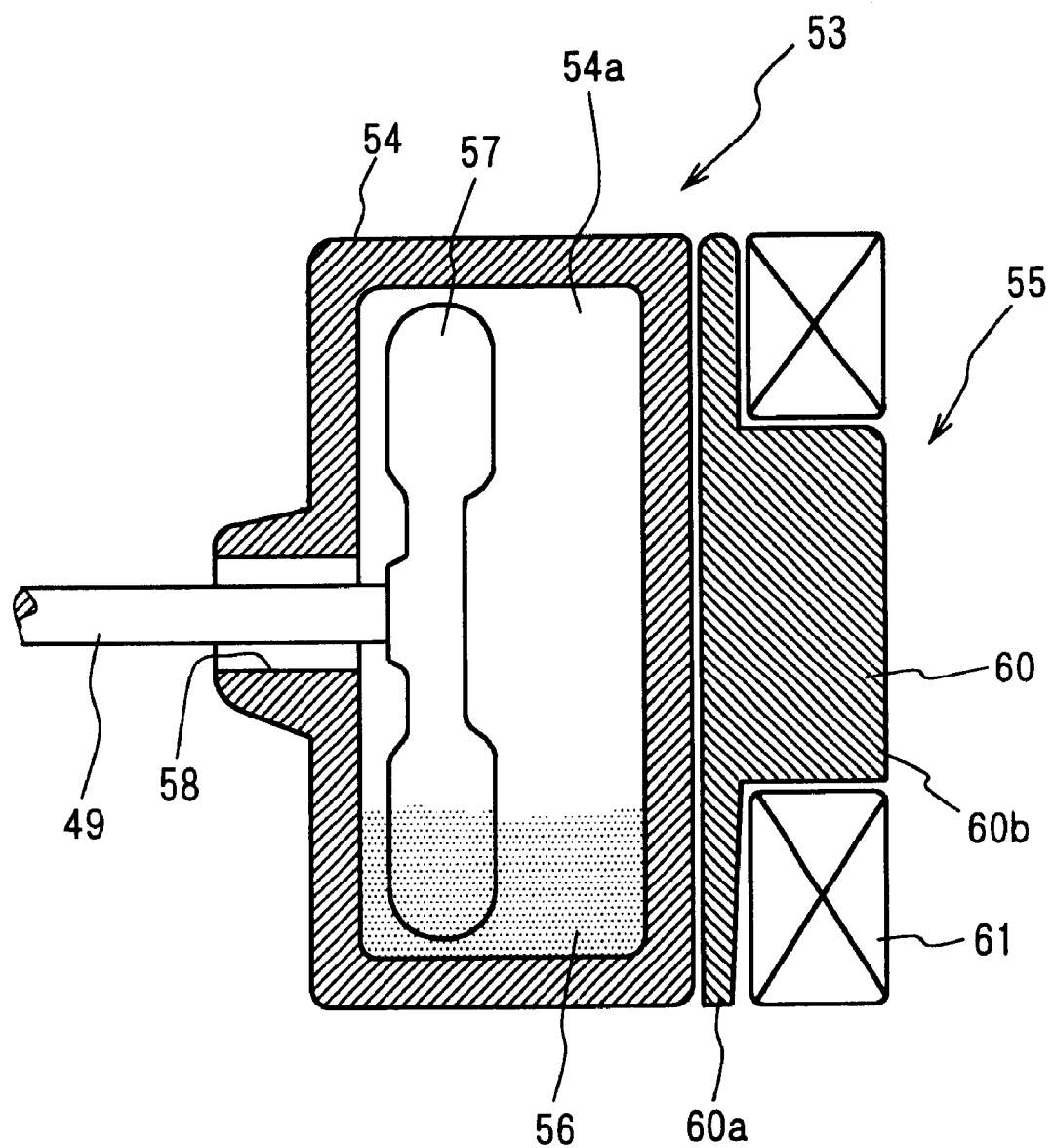
FIG. 15 is a cross-sectional view of yet another example of the resistance force generator of the present invention.

In this example, as shown in FIG. 15, container 54 is arranged so as to have, in a part separated from rotating vanes 57, a space 54a in which magnetic powder 56 collects when a magnetic field is generated. That is, normally, as shown in FIG. 15, no current flows in coil 61, magnetic powder 56 falls to the bottom of container 54, and only part of rotating vanes 57, namely their lower edges, come in contact with it. In this case, the quantity and type of magnetic powder 56 is selected so that a resistance force is applied to rotating vanes 57 by magnetic powder 56. Therefore, the rotation resistance of rotating vanes 57 at this time is large.

Figure 16:
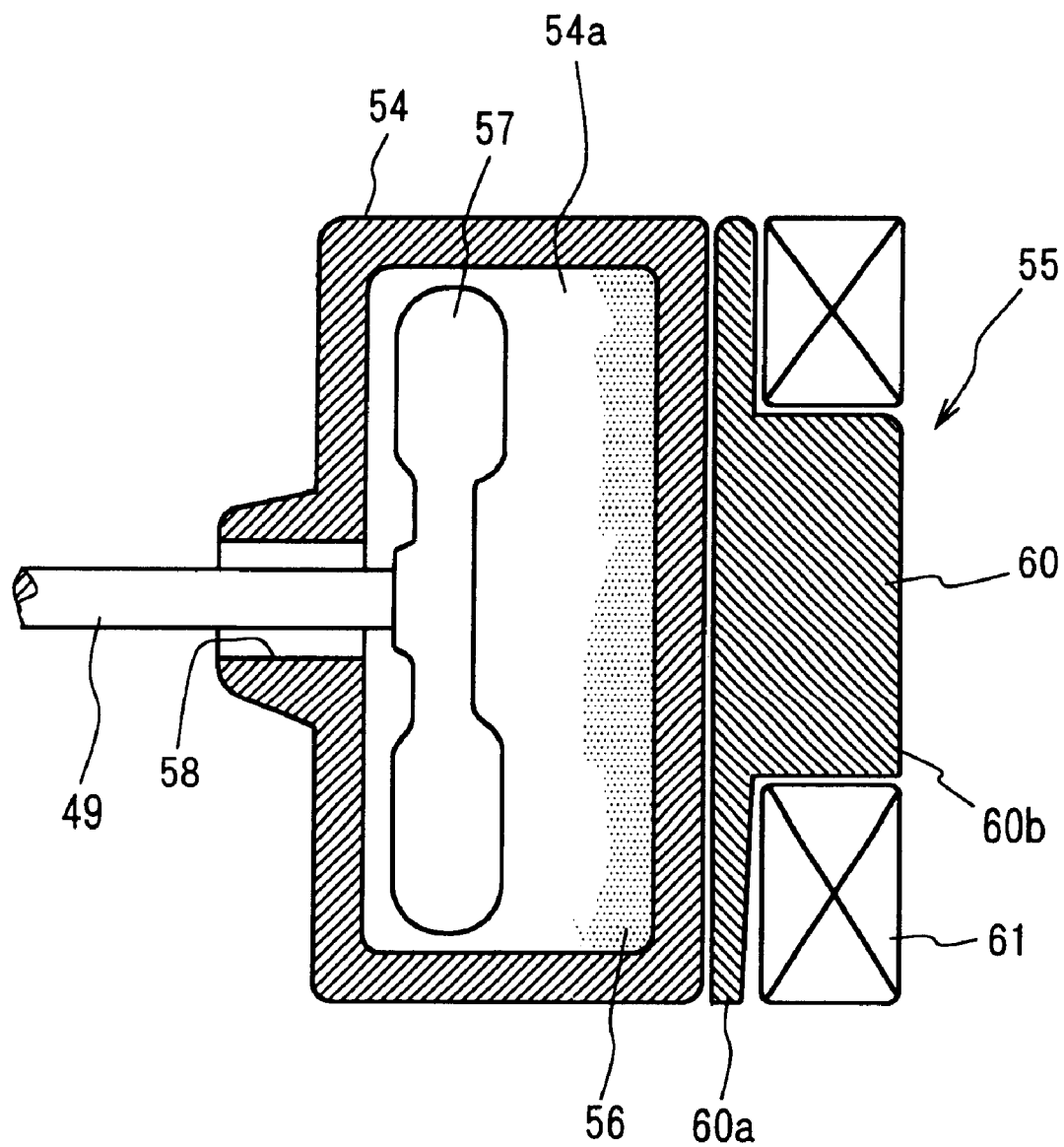
FIG. 16 is a cross-sectional view for explaining the operation of the reaction force generator of FIG. 15.

When current flows in coil 61 based on game information, as shown in FIG. 16, due to the magnetic field, magnetic powder 56 collects in space 54a, which is isolated from rotating vanes 57. Therefore the rotation resistance of rotating vanes 57 is made smaller in accordance with the current that flows in coil 61.

In this case too, one obtains on trigger 43 a resistance force that is proportional to the input operation speed of trigger 43, regardless of the input operation displacement.

Also, in each of the above examples, magnetic powder is used as the magnetic substance, but a magnetic fluid may be used as well.

Figure 17:
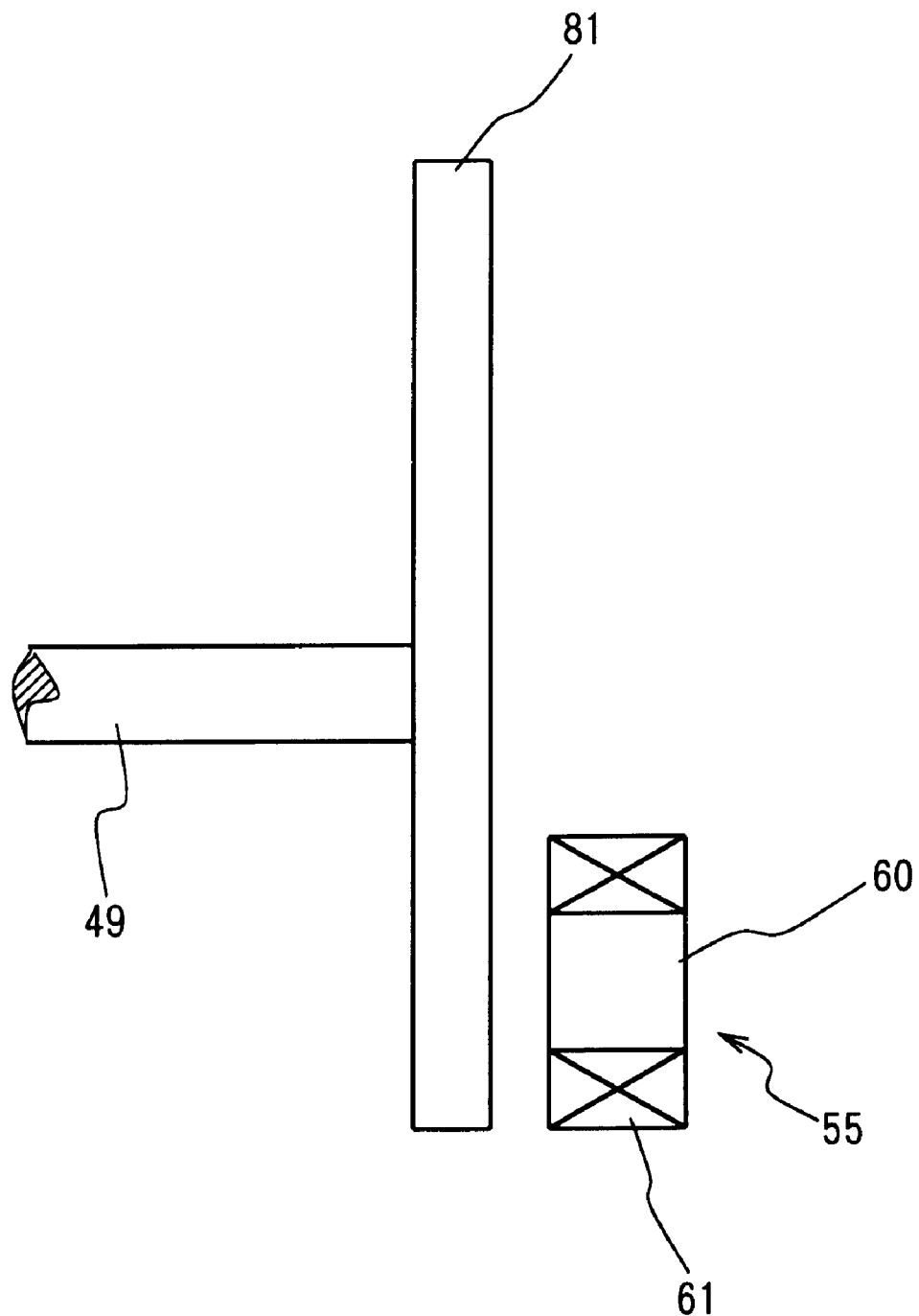
FIG. 17 is a perspective view showing the operation device of the game machine for explaining a second embodiment.

Next, a second embodiment of the present invention will be described with reference to FIG. 17. A magnetic circular disk (magnetic member) 81 is attached to shaft 49, and it turns based on the input operation of trigger 43. Also, electromagnet 61 is arranged so as to be opposed to and in the vicinity of the circumferential edge of this magnetic circular disk 81, and a magnetic field is generated toward magnetic disk 81 in accordance with game information.

In this configuration, resistance force corresponding to the input operation can be generated, in accordance with game information, on trigger (input operation unit) 43 of operation device (input means) 33 that inputs information to game machine main unit 31, and the resistance force can be increased in proportion to the operation speed of trigger 43.

As described above, according to the present invention, a "resistance force" that is proportional to the operation speed of the input operation unit can be generated, the number of parts can be reduced, and superior effects can be rendered, such as obtaining a full direct feel in the sense of touch that is conveyed to the fingertips.

What is claimed is:

1. An operation device that communicates with a game device that generates game information and communicates said game information to a resistance force generator incorporated in said operation device, said operation device comprising:

input means that communicates input device information to said game device, said resistance force generator further comprising:

a container which accommodates a particulate magnetic substance that is movable from an inactive position to an activated position;

a rotation member provided inside said container and connected to said input means, said rotation member being rotatable in response to operation of said input means and independent of said game information; and a magnetic field generation means which generates a magnetic field inside said container in accordance with game information generated by said game device and which causes said particulate magnetic substance to move from said inactive position to said activated position upon activation of a magnetic field inside said container, wherein said particulate magnetic substance in said inactive position generates a first resistance to rotation in said rotation member, and wherein said particulate magnetic substance in said activated position generates a second resistance to rotation in said rotation member, said first and second resistances to rotation generating first and second resistances to movement in said input means in accordance with game information.

2. The operation device according to claim 1, wherein said rotation member further comprises a peripheral edge, and wherein only said peripheral edge is immersed in said particulate magnetic substance when there is no magnetic field generated by said magnetic field generation means.

3. The operation device according to claim 1, wherein said rotation member further comprises a side extending along a diameter of said rotation member, and wherein only said side is immersed in said particulate magnetic substance when there is no magnetic field generated by said magnetic field generation means.

4. The operation device according to claim 1, wherein said rotation member further comprises at least one chamber, and wherein said particulate magnetic substance is housed in said at least one chamber when in said activated position.

5. The operation device according to claim 4, wherein said rotation member further comprises a plurality of chambers, and wherein said particulate magnetic substance is housed in said plurality of chambers when in said activated position.

6. The operation device according to claim 1, wherein said rotation member is of a nonmagnetic substance.

7. The operation device according to claim 1, wherein said rotation member further comprises a plurality of rotating vanes.

8. The operation device according to claim 7, wherein at least one vane of said plurality is not in contact with said particulate magnetic substance when said particulate magnetic substance is in said inactive position.

9. The operation device according to claim 1, wherein said particulate magnetic substance is a magnetic powder.

10. The operation device according to claim 1, wherein said particulate magnetic substance is a magnetic fluid.

11. The operation device according to claim 1, wherein said magnetic field generation means is an electromagnet.

12. The operation device according to claim 1, wherein said container further comprises an area that accommodates said particulate magnetic substance in said activated position such that said particulate magnetic substance does not contact said rotation member when said particulate magnetic substance is in said activated position and such that there is no resistance to rotation in said rotation member.

13. The operation device according to claim 1, wherein said first resistance to rotation in said rotation member that is greater than said second resistance to rotation in said rotation member.

14. The operation device according to claim 1, wherein said first resistance to rotation in said rotation member that is less than said second resistance to rotation in said rotation member.

15. The operation device according to claim 1, wherein said input means further comprises a hand-operated trigger that generates movement in said rotation member independent of said game information.

16. The operation device according to claim 15, wherein said input means further comprises at least one button that generates input device information independent of game information and that does not result in rotation of said rotation member.

17. The operation device according to claim 15, wherein said hand-operated trigger is more difficult to operate when said particulate magnetic substance is in said activated position than when said particulate magnetic substance is in said inactivated position.

18. The operation device according to claim 15, wherein said hand-operated trigger is less difficult to operate when said particulate magnetic substance is in said activated position than when said particulate magnetic substance is in said inactivated position.

19. The operation device according to claim 15, wherein said hand-operated trigger is connected to said rotation member by a spring-biased linkage, such that movement of said hand-operated trigger translates directly into movement of said rotation member.

20. The operation device according to claim 1, wherein said input means is connected to said rotation member by a spring-biased linkage, such that movement of said input means translates directly into movement of said rotation member, and wherein said spring-biased linkage is connected to a knob that communicates movement of said input means to said game device.

* * * * *